(12) United States Patent
McCann et al.

(10) Patent No.: US 12,058,605 B2
(45) Date of Patent: *Aug. 6, 2024

(54) GROUP-ADDRESSED TRANSMISSION OF INFORMATION RELATING TO AN ACCESS NETWORK

(71) Applicant: OT Patent Escrow, LLC, Chicago, IL (US)

(72) Inventors: Stephen McCann, Southampton (GB); Michael Peter Montemurro, Toronto (CA)

(73) Assignee: Malikie Innovations Limited, Dublin (IE)

( * ) Notice: Subject to any disclaimer, the term of this patent is extended or adjusted under 35 U.S.C. 154(b) by 315 days.

This patent is subject to a terminal disclaimer.

(21) Appl. No.: 16/921,507

(22) Filed: Jul. 6, 2020

(65) Prior Publication Data

US 2020/0336970 A1    Oct. 22, 2020

Related U.S. Application Data

(63) Continuation of application No. 15/333,859, filed on Oct. 25, 2016, now Pat. No. 10,750,432.

(51) Int. Cl.
*H04W 48/10* (2009.01)
*H04W 4/08* (2009.01)
(Continued)

(52) U.S. Cl.
CPC ........... *H04W 48/10* (2013.01); *H04W 48/14* (2013.01); *H04W 48/16* (2013.01);
(Continued)

(58) Field of Classification Search
CPC ............ H04L 12/1836; H04L 12/1877; H04L 12/189; H04W 28/18; H04W 52/26; H04W 52/267; H04W 52/327
See application file for complete search history.

(56) References Cited

U.S. PATENT DOCUMENTS

| 7,525,965 B1 | 4/2009 | St. Pierre | |
| 7,724,738 B2 * | 5/2010 | Chao | H04L 49/10 370/432 |

(Continued)

FOREIGN PATENT DOCUMENTS

| CN | 103249028 A | 8/2013 |
| CN | 105027627 A | 11/2015 |

(Continued)

OTHER PUBLICATIONS

Microsoft Computer Dictionary 352 (5th ed. 2002).*
(Continued)

*Primary Examiner* — Redentor Pasia
(74) *Attorney, Agent, or Firm* — Botos Churchill IP Law LLP

(57) ABSTRACT

In some examples, an access point determines, based on at least one criterion that includes a non-time based criterion, whether to activate group-addressed transmission of information relating to an access network. In response to determining, based on the at least one criterion, to activate group-addressed transmission of information relating to the access network, the access point transmits information relating to the access network in a message targeted to a group address.

18 Claims, 4 Drawing Sheets

```
         ┌─ AP PROCESS ─┐
                │
                ▼                                    ╱─ 202
┌──────────────────────────────────────────────────┐
│ DECIDE, BASED ON AT LEAST ONE CRITERION, WHETHER │
│   TO ACTIVATE GROUP-ADDRESSED TRANSMISSION OF    │
│    INFORMATION RELATING TO AN ACCESS NETWORK     │
└──────────────────────────────────────────────────┘
                │
                ▼
┌────────────────────────────────────────────────────────┐
│ IN RESPONSE TO DECIDING, BASED ON THE AT LEAST ONE     │
│ CRITERION, TO ACTIVATE GROUP-ADDRESSED TRANSMISSION    │
│ OF INFORMATION RELATING TO THE ACCESS NETWORK,         │
│ TRANSMIT INFORMATION RELATING TO THE ACCESS NETWORK    │
│ IN A MESSAGE TARGETED TO A GROUP ADDRESS               │
└────────────────────────────────────────────────────────┘
                                                    ╲─ 204
```

(51) Int. Cl.
*H04W 48/14* (2009.01)
*H04W 48/16* (2009.01)
*H04W 72/121* (2023.01)
*H04W 84/12* (2009.01)

(52) U.S. Cl.
CPC ............ *H04W 72/121* (2013.01); *H04W 4/08* (2013.01); *H04W 84/12* (2013.01)

(56) References Cited

U.S. PATENT DOCUMENTS

| | | | | |
|---|---|---|---|---|
| 8,675,547 | B2* | 3/2014 | Ponnuswamy | ....... H04W 24/00 455/457 |
| 9,008,062 | B2 | 4/2015 | Sun | |
| 9,820,259 | B2* | 11/2017 | Wang | ...................... H04W 4/06 |
| 2006/0050659 | A1* | 3/2006 | Corson | ................. H04W 8/186 370/310 |
| 2007/0002859 | A1 | 1/2007 | Corson | |
| 2007/0189290 | A1 | 8/2007 | Bauer | |
| 2008/0049703 | A1 | 2/2008 | Kneckt | |
| 2008/0151796 | A1* | 6/2008 | Jokela | ................... H04W 48/08 370/310 |
| 2008/0198771 | A1* | 8/2008 | Iyengar | ................... H04L 45/16 370/390 |
| 2009/0052362 | A1* | 2/2009 | Meier | ...................... H04W 4/06 370/311 |
| 2011/0211518 | A1 | 9/2011 | Gupta | |
| 2013/0094484 | A1 | 4/2013 | Kneckt | |
| 2013/0111044 | A1 | 5/2013 | Cherian | |
| 2013/0294320 | A1 | 11/2013 | Jactat | |
| 2013/0294321 | A1* | 11/2013 | Wang | .................. H04W 72/005 370/312 |
| 2014/0281027 | A1 | 9/2014 | Gast | |
| 2014/0286226 | A1* | 9/2014 | Seok | ..................... H04W 56/00 370/312 |
| 2014/0321449 | A1* | 10/2014 | Dong | ................. H04L 61/2038 370/338 |
| 2014/0362842 | A1 | 12/2014 | Dong | |
| 2015/0078245 | A1 | 3/2015 | Anchan | |
| 2015/0373505 | A1 | 12/2015 | Hsieh | |
| 2016/0007275 | A1 | 1/2016 | Park et al. | |
| 2017/0070418 | A1 | 3/2017 | Li | |
| 2017/0201866 | A1* | 7/2017 | Liu | ......................... H04W 4/80 |
| 2018/0206137 | A1* | 7/2018 | Ryu | ......................... H04W 4/70 |
| 2019/0174270 | A1* | 6/2019 | Shan | ....................... H04W 4/70 |

FOREIGN PATENT DOCUMENTS

| | | |
|---|---|---|
| CN | 105532023 A | 4/2016 |
| EP | 1730885 | 12/2006 |
| EP | 2793448 A1 | 10/2014 |
| WO | 2013025168 A1 | 2/2013 |

OTHER PUBLICATIONS

IEEE, Standard for Information Technology—Telecommunications and Information Exchange Between Systems Local and Metropolitan area networks—Specific Requirements; Part 11: "Wireless LAN Medium Access control (MAC) and Physical Layer (PHY) Specifications"; 2012; 2,793 pages.
IEEE P802.11ai™/D10.0 Draft Standard for Information technology—Telecommunications and information exchange between systems, Local and metropolitan area networks—Specific requirements, Part 11: Wireless LAN Medium Access Control (MAC) and Physical Layer (PHY) Specifications Amendment to IEEE P802.11-REVmcTM/D8.0: Fast Initial Link Setup, Aug. 2016 (188 pages).
IEEE P802.11aq™/D7.0, Draft Standard for Information technology™Telecommunications and information exchange between systems, Local and metropolitan area networks—Specific requirements Part 11: Wireless LAN Medium Access Control (MAC) and Physical Layer (PHY) Specifications, Amendment 3: Pre-Association Discovery, Sep. 2016 (50 pages).
European Patent Office, International Search Report and Written Opinion for PCT/EP2017/074417 dated Nov. 29, 2017 (15 pages).
European Patent Office, Extended European Search Report for Appl. No. 21184677.9 dated Oct. 11, 2021 (10 pages).
The Extended European Search Report for European Patent Application No. 23219445.6, Jun. 12, 2024, 11 Pages.
Kneckt, et al., "Active Scanning", Nokia, Doc.: IEEE 802.11-11/1619r3, vol. 802.11ai, No. 3, 2012, pp. 1-15.
Smith, "Optional Use of FILS Discovery as Probe Response", DSP Group, doc.: IEEE 802.11-12/0928-00-00ai, 2012, pp. 1-7.

* cited by examiner

GROUP-ADDRESSED TRANSMISSION OF INFORMATION RELATING TO AN ACCESS NETWORK

CROSS-REFERENCED TO RELATED APPLICATION

This is a continuation of U.S. application Ser. No. 15/333,859, filed Oct. 25, 2016, which is hereby incorporated by reference in its entirety.

BACKGROUND

Devices such as computers, handheld devices, or other types of devices can communicate over wired or wireless networks. Wireless networks can include a wireless local area network (WLAN), which includes wireless access points (APs) to which devices are able to wirelessly connect. Other types of wireless networks include cellular networks that comprise wireless access network nodes to which devices are able to wirelessly connect.

BRIEF DESCRIPTION OF THE DRAWINGS

Some implementations of the present disclosure are described with respect to the following figures.

DETAILED DESCRIPTION

Figure 1:
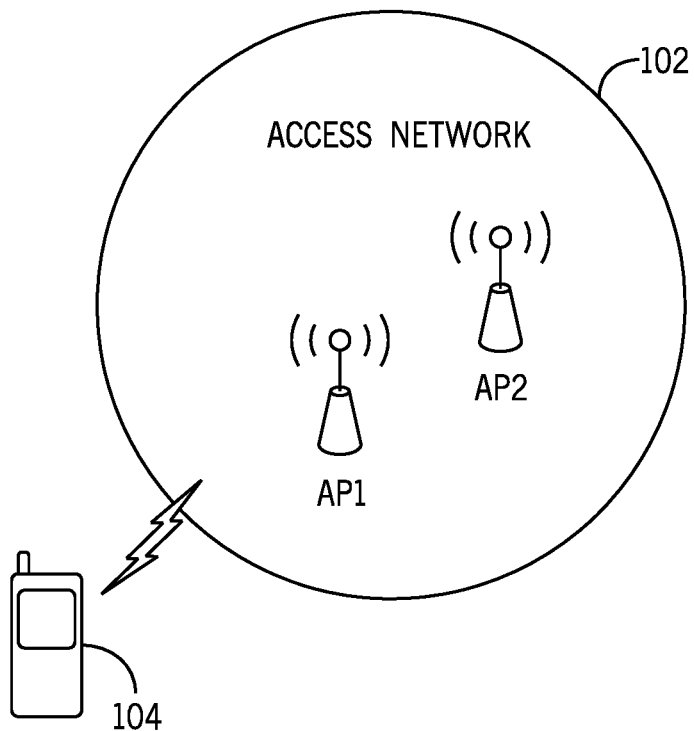
FIG. 1 is a block diagram of an example network arrangement according to some implementations.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In a wireless local area network (WLAN), a wireless device may communicate with one or multiple wireless access points (APs). A wireless AP (or more simply, an AP) can refer to a communication device to which a wireless device can establish a wireless connection to communicate with other endpoint devices. WLANs can include wireless networks that operate according to the Institute of Electrical and Electronic Engineers (IEEE) 802.11 or Wi-Fi Alliance Specifications. In other examples, WLANs can operate according to other protocols. More generally, techniques or mechanisms according to some implementations of the present disclosure can be used with various types of wireless networks, such as WLANs, cellular networks, or other wireless networks. In a cellular network, an AP can refer to a wireless access network node, such as a base station or enhanced node B (eNodeB) in a cellular network that operates according to the Long-Term Evolution (LTE) standards as provided by the Third Generation Partnership Project (3GPP). The LTE standards are also referred to as the Evolved Universal Terrestrial Radio Access (E-UTRA) standards. An AP can also refer to a fifth generation (5G) wireless access network node, or another type of wireless access network node.

In a cellular network, a wireless device can refer to a user equipment (UE) in the cellular network that operates according to the Long-Term Evolution (LTE) standards as provided by the Third Generation Partnership Project (3GPP). A wireless device can also refer to a fifth generation (5G) wireless device, a UE, or another type of wireless equipment.

Examples of wireless devices include computers (e.g., tablet computers, notebook computers, desktop computers, etc.) handheld devices (e.g. smart phones, personal digital assistants, etc.), wearable devices (smart watches, electronic eyeglasses, head-mounted devices, etc.), game appliances, health monitors, vehicles (or equipment in vehicles), or other types of endpoint or user devices that are able to communicate wirelessly. Wireless devices can include mobile devices and/or fixed position devices. More generally, a wireless device can refer to an electronic device that is able to communicate wirelessly.

A wireless device can perform discovery to identify available services or devices of wireless networks. Identifying available services or devices of wireless networks can include identifying information relating to the services or devices. Examples of information relating to devices of wireless networks can include any or some combination of the following: information about the wireless networks, information about APs, information about operators of APs, information about locations of APs, information about roaming relationships of APs, information about neighbors of APs, information about addresses that can be used by wireless devices, information about endpoint or user devices in the wireless networks, and so forth. Examples of information about services offered by wireless networks can include any or some combination of the following: information of specific service providers accessible through an AP, information about a cellular network accessible through an AP, information about capabilities of an AP, information about an authentication type used to perform authentication, information about an Internet Protocol (IP) address version or type that can be allocated, information about metrics of a connection between an AP and an external network (e.g., the Internet), information about communication protocols and ports of an AP, and so forth.

An AP can transmit information (including any of the foregoing information or other information) that can be used by a wireless device, or multiple wireless devices, to assist in selecting an AP, from among multiple APs, to associate with.

FIG. 1 is a block diagram of an example access network 102 that includes access points (e.g., AP1 and AP2 depicted in FIG. 1). In some examples, the access network 102 can be a WLAN that operates according to IEEE 802.11. In other examples, the access network 102 can be a cellular access network, and the wireless device 104 can be a cellular user equipment (UE). In the example of FIG. 1, a wireless device 104 is able to communicate with either AP1 or AP2 (or both). Generally, an "access network" can refer to a wireless network that is useable by a wireless device to access another endpoint.

Prior to association between the wireless device 104 and an AP (which refers to a pre-associated state of the wireless device 104 and the AP), the wireless device 104 and the AP can exchange certain information. Association between a wireless device and an AP refers to a process in which the wireless device is able to register with and establish a connection with the AP to communicate user plane traffic with other endpoint devices. Examples of information that can be exchanged in the pre-associated state include beacons that are broadcast by an AP. As further examples, the wireless device 104 can send probe requests to the AP to seek more information from the AP, and the AP can respond to the probe requests with probe responses.

According to IEEE 802.11, a wireless device can operate in one of four connection states: (1) an initial start state, where the wireless device is unauthenticated and not associated; (2) an authenticated, not associated, state; (3) an authenticated and associated pending Robust Security Network (RSN authentication) state; and (4) an authenticated and associated state. In the context of IEEE 802.11, a pre-associated state can refer to state (1) above. However, in other contexts, a pre-associated state can refer to any state in which a wireless device has not yet established a connection with an AP that allows the wireless device to communicate user plane traffic with other endpoint devices through the AP.

Issue 1 Relating to Generic Advertisement Service (GAS) Frames

In some examples, a Generic Advertisement Service (GAS) transport mechanism can be used for bidirectional transmission of frames between a wireless device and a server (that is connected to an AP or that is within the AP itself) prior to network connectivity (e.g., in the pre-associated state). A "frame" can refer generally to a unit of information (such as a message, an information element, etc.) that can be communicated between devices. Prior to network connectivity, such as in the pre-associated state, user plane traffic cannot be communicated through the AP. In some examples, a wireless device can scan (i.e., listen to beacons or probe responses) to discover an AP by sending GAS queries. A server that receives a GAS query can respond with a GAS response. A GAS query is also referred to as a GAS query frame and a GAS response is also referred to as a GAS query response frame.

GAS can be used by a wireless device to acquire information relating to an access network, such as any or some combination of the following: information of services offered by the access network or an AP located in the access network, information of an external network that can be reached by an AP, and so forth. Traditionally, GAS frames are unicast (point-to-point) messages exchanged between a wireless device and an AP. A wireless device transmits a GAS query to an AP, and the AP responds with a corresponding GAS response. If there are a large number of wireless devices that are able to communicate with the AP, then there can be a corresponding large number of GAS queries that can be sent by the multiple wireless devices (and corresponding GAS responses from the AP). If multiple wireless devices are sending GAS queries to seek the same information, then the communication of the multiple GAS queries and corresponding GAS responses would result in inefficient usage of the wireless medium between the wireless devices and the AP. Thus, it is desirable to reduce the number of GAS queries and GAS responses transmitted over a wireless medium.

Issue 2 Relating to Fast Initial Link Setup (FILS) Discovery Frames

In other examples, other information that can be communicated between wireless devices and an AP can be included in a Fast Initial Link Setup (FILS) Discovery frame, which is a type of Beacon frame that includes information about a FILS-capable AP. FILS is described by the IEEE 802.11ai amendment. FILS enables a FILS-capable wireless device to perform a fast initial link setup with a FILS-capable AP. The FILS discovery frame is transmitted on a regular (periodic) basis, and is designed to be transmitted at different intervals (e.g. longer intervals) than that of an IEEE 802.11 beacon. Since the FILS Discovery frame is transmitted on a regular basis, the periodic transmissions of FILS Discovery frames can consume wireless medium bandwidth, even when no wireless devices are in range or are capable of receiving the FILS Discovery frames.

Solutions

In accordance with some implementations of the present disclosure, to address the issues of inefficient usage of a wireless medium to provide information relating to an access network during a pre-associated state, or more generally, prior to network connectivity of a wireless device, an AP is able to selectively determine when or whether to perform group-addressed transmission of information relating to the access network.

Figure 2:
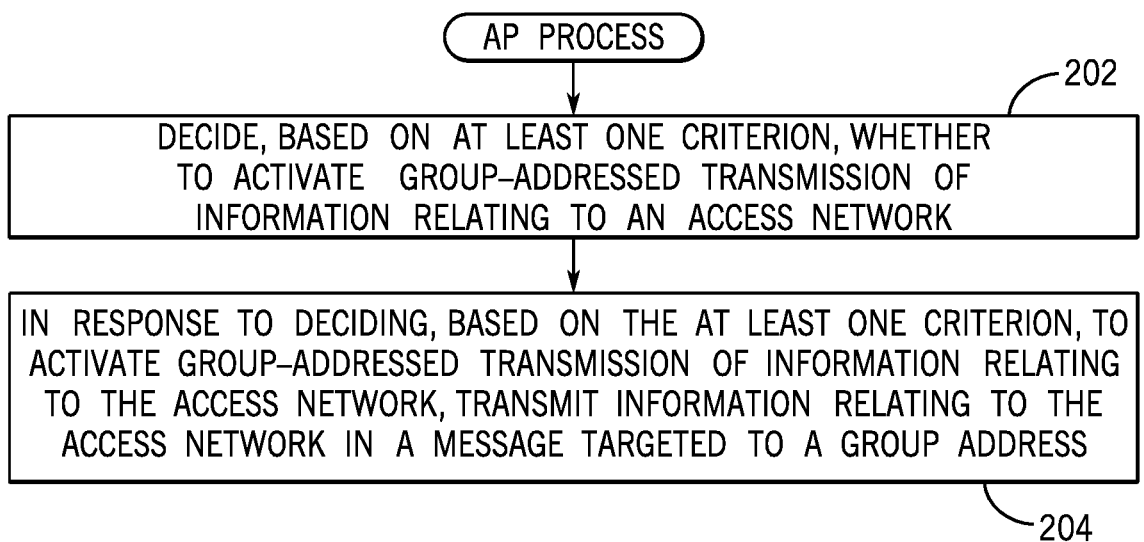
FIGS. 2 and 3 are flow diagrams of processes of an access point (AP) according to some implementations.

FIG. 2 is a flow diagram of an example process that can be performed by the AP, such as AP1 or AP2 depicted in FIG. 1. The AP decides (equivalently "determines") (at 202), based on at least one criterion, whether to activate group-addressed transmission of information relating to an access network. In response to deciding, based on the at least one criterion, to activate group-addressed transmission of information relating to the access network, the AP transmits (at 204) information relating to the access network in a message targeted to a group address. A message that is targeted to a group address is a message that can be received by multiple wireless devices. The wireless devices that are able to receive the message targeted to the group address are those that are able to determine, based on presence of the group address in the message, that the message is to be received and processed by the wireless device.

It is noted that the at least one criterion includes a non-time based criterion. In other words, the non-time based criterion is a criterion unrelated to a schedule or a time interval that specifies when information is to be transmitted by an AP. Information relating to the access network can include information associated with the access network, or information associated with an AP located in the access network, or information associated with an external network or device that the AP is able to communicate with.

In some examples, the at least one criterion can include any one or some combination of the following: a number of wireless devices associated with the AP, a number of queries (e.g., GAS queries) received over a time duration, a level of congestion of a communications medium (e.g., a wireless medium or a backhaul link between the AP and another device, such as another AP or a server), a policy or configuration of the AP, and other criteria. It is noted that in other examples, additional or alternative criteria can be employed.

In some examples, the message targeted to a group address that carries the information relating to the AP can include a GAS response frame sent by the AP. Such a GAS response frame that is targeted to a group address can be referred to as a Group Address (GAS) response frame (hereinafter referred to as a "GA-GAS response frame").

In other examples, the message targeted to a group address is a FILS Discovery frame.

In further examples, the message targeted to a group address may include other types of messages.

Group Addressed GAS Response Frame

A GA-GAS response frame is a GAS response frame that is transmitted with a group address as opposed to a unicast address, such that the GA-GAS response frame can be received by multiple wireless devices. For example, the AP can use GA-GAS response frames when the AP determines that the AP has received and is processing a high volume of similar GAS queries. In other examples, the AP can use additional or alternative criteria (such as those listed above) to decide whether or not to transmit GA-GAS response frames or unicast GAS response frames. The AP is able to operate either in GA mode (in which the AP transmits GA-GAS response frames) or in unicast mode (in which the AP transmits unicast GAS response frames). Based on one or more criteria, the AP is able to decide whether to operate in GA mode or in unicast mode. Note that in some cases, it is possible that a single GAS query from a wireless device can trigger the AP to operate in GA mode.

The AP transmits the GA-GAS response frame as a group address management frame, so that all wireless devices on the same channel as that of the AP can receive and decode the frame. In some examples, an existing GAS frame is modified to form the GA-GAS response frame that is transmitted from an AP when operating in the GA mode.

Figure 3:
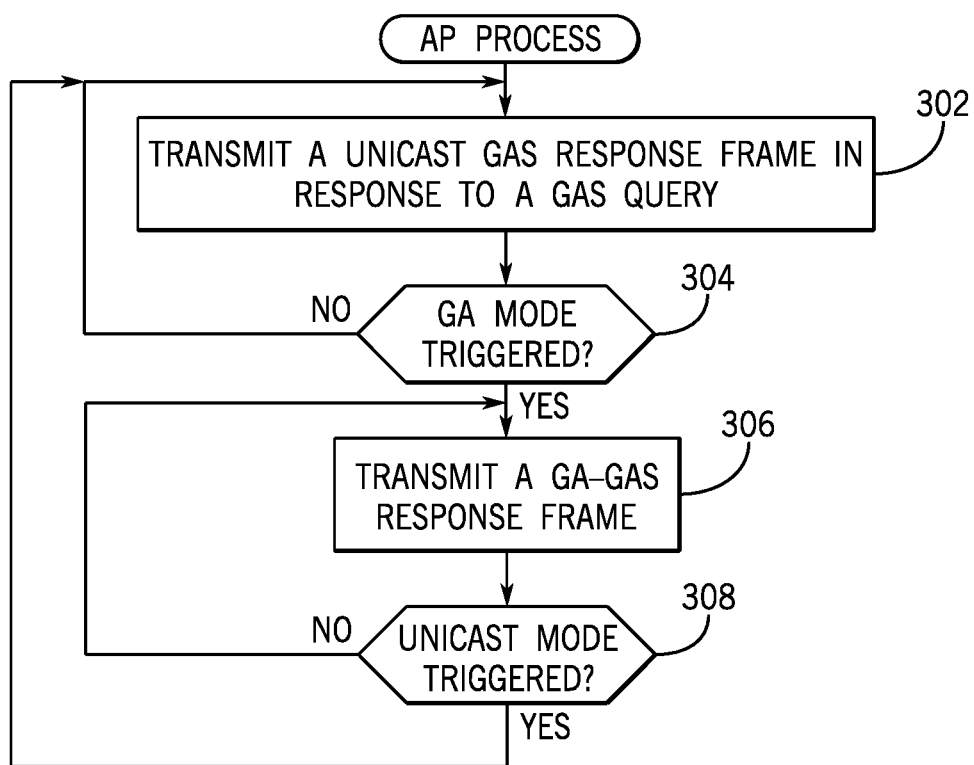

FIG. 3 is a flow diagram of an example process performed by an AP according to some implementations. It is assumed that in FIG. 3, the AP is initially in the unicast mode. In the unicast mode, the AP transmits (at 302) a unicast GAS response frame (targeted to an address of an individual wireless device) in response to a GAS query from the wireless device. The AP determines (at 304) whether GA mode is triggered. GA mode is triggered in response to at least one criterion being satisfied, including any or some combination of the criteria listed above. For example, the GA mode can be triggered in response to the AP determining that the number of GAS queries received in a specific time duration exceeds a threshold, which can include the reception of a single GAS query within a long time duration (e.g. a day). In other examples, the GA mode can be triggered in response to other criteria, either in combination or as an alternative to the number of queries received over a time duration.

In response to determining the GA mode is not triggered, the AP proceeds back to task 302 to transmit a unicast GAS response frame in response to a GAS query. However, in response to a GA mode being triggered, the AP transmits (at 306) a GA-GAS response frame (or multiple GA-GAS response frames). In some examples, when GA mode starts, the AP can start a duration timer $T_d$ and transmit a GA-GAS response frame every X time units (TUs). The transmission of the GA-GAS response frame every X TUs can occur for a specified duration, e.g., Y TUs. The values of X and Y can be provided by the AP to wireless devices in one or more messages, or the X and Y values can be configured statically at the wireless devices. When the duration timer $T_d$ counts the specified duration (Y TUs), then the AP can exit the GA mode.

In other examples, instead of remaining in the GA mode for a specified time duration (e.g., Y TUs), the AP can wait for another condition to occur before exiting the GA mode and transitioning back to the unicast mode.

While the AP is in the GA mode, the AP may receive GAS queries from wireless devices. In some examples, the AP may choose to ignore the GAS queries and continue to send GA-GAS response frames, or alternatively, can decide to limit or lengthen the duration of time in which the AP is in the GA mode.

The AP determines (at 308) whether a unicast mode has been triggered. As noted above, in some examples, unicast mode is triggered in response to expiration of the specified time duration (e.g., Y TUs). In other examples, the AP can decide to activate unicast mode in response to other criteria, such as any or some combination of the following: the number of associated wireless devices, a number of queries received over a time duration, congestion in a communications medium (e.g., a wireless medium or a backhaul network), the policy or configuration of the AP, and other criteria.

If the unicast mode is not triggered, the AP continues to transmit a GA-GAS response frame (at 306). However, if the unicast mode is triggered, then the AP transitions back to transmitting (at 302) a unicast GAS response frame in response to a GAS query.

In some examples, wireless devices can transmit advertisement protocol queries transported by GAS message frames (e.g. GAS queries and GAS query responses). For example, an advertisement protocol can include an Access Network Query Protocol (ANQP), which allows wireless devices to transmit ANQP requests and receive ANQP responses from an AP, where the ANQP responses contain information useful in a wireless device's network selection process. For example, such information can include an AP operation's domain name, Internet Protocol (IP) addresses available at the AP, information about potential roaming partners accessible through the AP, and other criteria.

Advertisement protocol queries can be transported by GAS query frames that request different types of information within a short period of time. In some cases, the AP can still use the GA mode to respond to these queries, to reduce a short term processing overload. Alternatively, the AP can filter queries received by the AP, to allow the AP to respond to certain types of queries using the GA mode, and other queries using the unicast mode. In some examples, an AP can filter a query based on an Info ID field, such as that carried by an ANQP request. The Info ID field identifies the type of query that a wireless device is transmitting. For example, when using the ANQP, the Info ID field being equal to 265 indicates a query for the AP's location in a specified format. Other values of the Info ID field indicate other types of queries. Generally, based on the filtering of queries performed at the AP, the AP can decide whether to respond to the queries using a unicast GAS response frame or a GA-GAS response frame.

In some examples, the AP can send, to wireless devices, management information relating to the GA mode. For example, the AP can transmit a GA mode indicator while the AP is operating in the GA mode, to indicate to wireless devices that the AP is operating in the GA mode. In some examples, the GA mode indicator can be included in a Beacon frame, a Probe Response frame, or any other message that is sent by the AP to one or more wireless devices. The GA mode indicator can include a single bit, or a collection of bits.

In further examples, the AP can also transmit a GA Interval frame, which can be in a Beacon frame, a Probe Response frame, or another message. The GA Interval frame includes scheduling information of GA-GAS response frames, where the scheduling information specifies how often and how long GA-GAS response frames are transmitted. For example, the GA Interval frame can include values of X and Y discussed above in connection with FIG. 3. In such examples, the AP can transmit a GA-GAS response frame every X TUs for a specified duration of Y TUs. Using the information in the GA Interval frame, wireless devices are able to determine when and for how long GA-GAS response frames are expected from the AP operating in the GA mode, and the wireless devices can then adjust their GAS operations accordingly.

Figure 4:
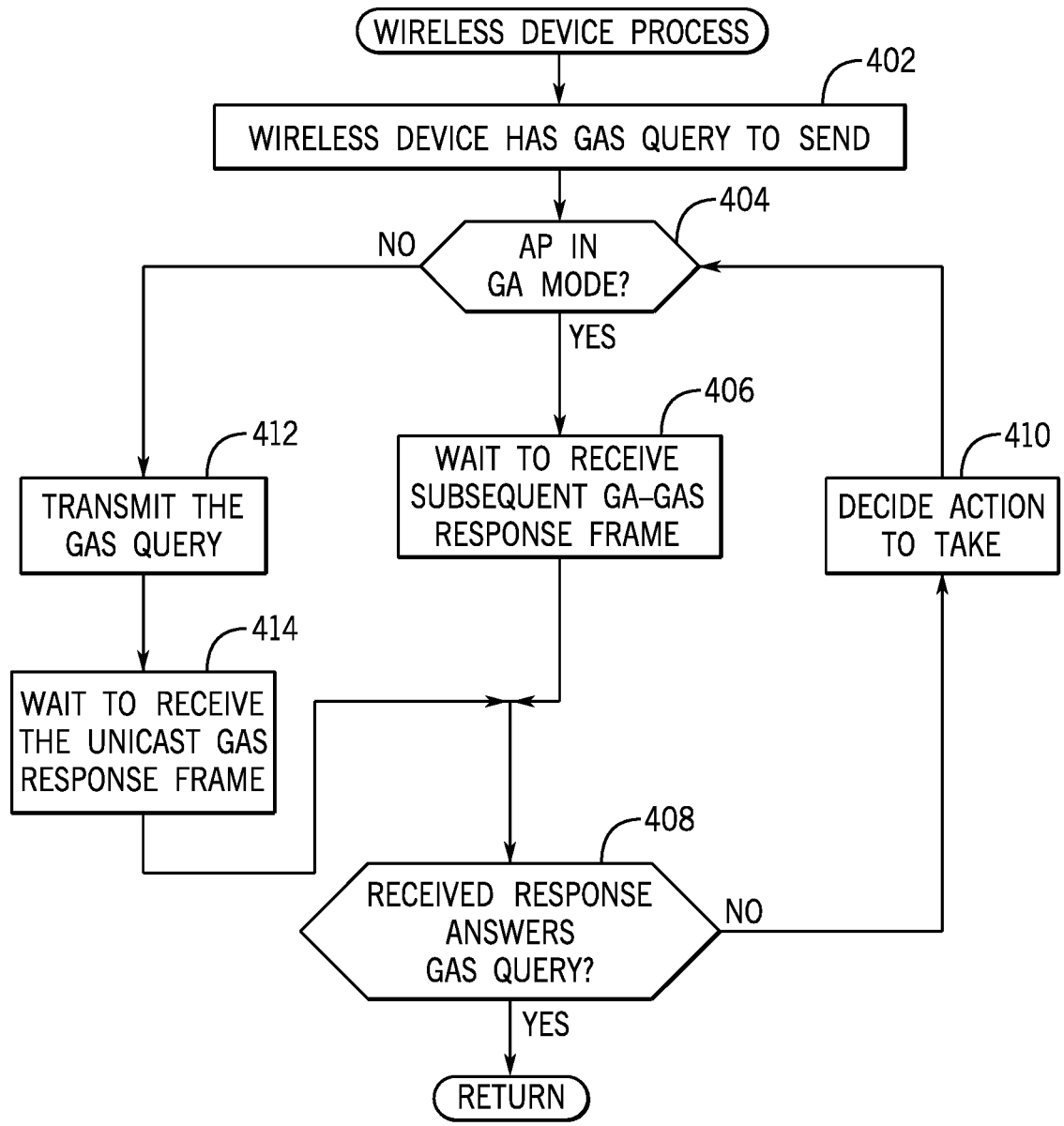
FIG. 4 is a flow diagram of an example process of a wireless device according to some implementations.

FIG. 4 is a flow diagram of an example process performed by a wireless device, according to some implementations of the present disclosure. In other examples, other processes can be performed by the wireless device.

It is assumed that the wireless device has a GAS query to send (402). The wireless device determines (at 404) whether the AP is in the GA mode or the unicast mode. This can be based on the wireless device determining whether or not the AP has transmitted a GA mode indicator, or indeed that the wireless device has received a GA-GAS response frame sent by the AP (e.g., the AP happens to be in the GA mode, when the wireless device wishes to send a GAS query)

If the wireless device determines that the AP is in the GA mode, the wireless device does not send the GAS query, but instead waits to receive (at 406) a subsequent GA-GAS response frame sent by the AP. It is possible that the subsequent GA-GAS response may contain information that is being sought by the wireless device. This allows more efficient usage of the wireless medium between the wireless device and the AP since the wireless device may avoid sending the GAS query.

After a GA-GAS response frame has been received, the wireless device determines (at 408) whether the received GA-GAS response frame answers the GAS query that the wireless device wants to send. If so, then the process may return (with the wireless device not sending the GAS query).

However, if the received GA-GAS response frame does not answer the GAS query, then the wireless device decides (at 410) an action to take in response to determining that the received GA-GAS response frame does not answer the GAS query. In some cases, the wireless device can transmit the GAS query to the AP. In other cases, the wireless device may decide to listen to another received GA-GAS response frame without transmitting a GAS query.

If the wireless device determines (at 404) that the AP is not in GA mode (i.e., that the AP is in unicast mode), then the wireless device transmits (at 412) the GAS query to the AP. The wireless device waits to receive (at 414) the unicast GAS response frame. The wireless device then determines (at 408) whether the received unicast GAS response frame answers the GAS query, and continues based on this determination.

Note that while the wireless device is waiting to receive the unicast GAS response frame (at 414), the wireless device may actually receive a GA-GAS response frame, which may satisfy the transmitted GAS query.

At each of tasks 406 and 414, the GAS operation does not guarantee that any GAS response will either be transmitted by an AP or received by a wireless device. Timeouts within the wireless device can prevent the wireless device from waiting continuously for a response.

In other examples, a wireless device can receive a GA-GAS response frame without first receiving any GA mode indicator from the AP. This is performed because the GA-GAS response frame can be implemented as a uniquely identifiable Public Action frame, so the wireless device does not have to first receive a GA mode indicator from an AP to know that the AP is operating in the GA mode. Public Action frames, as defined by IEEE 802.11, allow communications between devices where the Public Action frames are not protected and can be intercepted by any device (in other words, the Public Action frames are public).

Correspondingly, if the wireless device receives a GA mode indicator (or an unsolicited GA-GAS response), the wireless device may suppress its GAS query entirely. In this case, the wireless device may modify its GAS retry timeout to take into account the fact that the AP may not send a unicast GAS response frame.

The following describes further details of various GAS frames, according to some examples. It is noted that in other examples, different forms of the GAS frames can be used.

In some examples, a GA-GAS Response frame is a new Public Action frame. In the present discussion, a new frame, a new information element, a new field, and so forth, can refer to a frame, information element, field, and so forth, that is not currently defined by the relevant standards, but which at a later time may be added (or not) to the relevant standards.

The GA-GAS Response frame is transmitted by a responding station (STA), such as an AP, to a requesting STA (such as a wireless device). The format of the GA-GAS Response frame is shown in the table below.

|  | Category | Public Action | Status Code | GAS Query Response Fragment ID | Advertisement Protocol element | Query Response Length | Query Response (optional) | Multi-band (optional) |
|---|---|---|---|---|---|---|---|---|
| Octets: | 1 | 1 | 1 | variable | 1 | variable | 2 | variable | variable |

The addressing of the GA-GAS Response frame is changed from unicast (as used by GAS) to multicast in the Public Action frame header. This is achieved by setting the Address 1 field of the frame header equal to a broadcast address, which is not shown in the table above.

The following describes the fields of the GA-GAS Response frame according to specific examples. It is noted that the GA-GAS Response frame can have fields in other examples.

The Category field is defined in IEEE 802.11-2012, Section 9.4.1.11 (Action field).

The Public Action field is a new value of 34 (or other new value) for a new GA-GAS Response frame, which can be added to IEEE 802.11-2012, Section 9.6.8.1 (Public Action frames).

The Status Code values are defined in IEEE 802.11-2012, Table 9-46 (Status codes). The same status code value will be present in all fragments of a multi-fragment query response.

The GAS Query Response Fragment ID is defined in IEEE 802.11-2012, Section 9.4.1.34 (GAS Query Response Fragment ID field).

The Advertisement Protocol element is defined in IEEE 802.11-2012, Section 9.4.2.93 (Advertisement Protocol element).

The Query Response Length field is defined in IEEE 802.11-2012, FIG. 9-669 (Query Response length field).

For a unicast GAS response frame defined in IEEE 802.11-2012, if the Query Response Length field is set to zero and there is no information to send, a unicast GAS response frame is still returned by the answering STA (e.g., the AP) back to the querying STA. This is to maintain coordination between GAS queries and GAS responses.

On the other hand, for a GA-GAS response frame, the GA-GAS response frame is only sent when information within the answering STA is available, unless an unsuccessful status code has to be transmitted back to the querying STA. This is because it would not be worthwhile for the answering STA operating in GA mode to send GA-GAS responses if there is no content in the GA-GAS responses.

The Query Response field is defined in IEEE 802.11-2012, FIG. 9-670 (Query Response field).

The Multi-band element is defined in IEEE 802.11-2012, Section 9.6.8.14.

The following describes details of a GA Interval frame according to specific examples. The GA Interval frame includes information about when GA-GAS responses are transmitted and how often (interval and duration). The duration is set by the AP.

The format of a new GA Interval frame is shown in the table below.

| Element ID | Length | Count | Period |
|---|---|---|---|
| Octets: 1 | 1 | 1 | 1 |

A new Element ID will be defined in IEEE 802.11-2012, Section 9.4.2.1 for this frame.

The Length field is defined in IEEE 802.11-2012, Section 9.4.2.1.

The Count field is set to the number of Target Beacon Transmission Times (TBTTs) until the beacon interval during which the next GA interval starts. A value of 1 indicates the GA interval starts during the beacon interval starting at the next TBTT. A value of 0 is reserved.

The Period field is set to the number of TUs between the GA-GAS transmissions. A value of the Period field can have a range between 10 and 255 TUs.

The GA Interval element can be optionally present in Beacon frames, as described in IEEE 802.11-2012, Section 9.3.3.3 (Beacon frame format), and Probe Response frames, as described in IEEE 802.11-2012, 9.3.3.11 (Probe Response frame format). It is up to the AP to determine if the GA Interval frame should be continuously transmitted or only when GA mode is activated.

There are a couple of ways of modifying IEEE 802.11-2012 or IEEE 802.11-2016 and subsequent versions of IEEE 802.11, to provide a GA mode indicator, such as within a Beacon frame or a Probe Response frame, to advertise that the AP is operating in the GA mode. If the GA mode indicator is a bit, the bit can be toggled between 0 to 1 based on whether or not the GA mode is activated or not.

The following describes examples of how the GA mode indicator can be communicated by an AP.

In some examples, an Interworking element according to IEEE 802.11 can be modified in the following manner to allow a STA (e.g., an AP) to advertise (within a Beacon frame) that the STA supports the GA mode.

For example, the following value can added to Table 9-214 of IEEE 802.11-2012 as shown in the table below.

| Access Network Type | Meaning | Description |
|---|---|---|
| 6 | GA mode | The network is operating in GA mode. |

In other examples, the GA mode indicator can be expressed as a modified Extended Capabilities bit as defined by IEEE 802.11. For example, the Extended Capabilities element can be modified in the following manner to allow an STA (e.g., an AP) to advertise (within a Beacon frame) that the STA supports the GA mode.

The following row can added to Table 8-103 of IEEE 802.11-2012 as shown below.

| Bit | Information | Notes |
|---|---|---|
| 75 | GA-GAS Capability | When dot11GAGASActivated is true, the GA-GAS Capability field is set to 1 to indicate that the STA supports the Service Transaction Protocol. When dot11GAGASActivated is false, the GA-GAS Capability field is set to 0 to indicate that the STA does not support this capability. |

A new MIB variable "dot11GAGASActivated" of type Boolean is introduced to support this capability bit. Note that the terminology "GA-GAS Capability" is only one example, as other terminologies are possible (e.g., direct mode).

There are other sections of the IEEE 802.11-2012 Specification that may be changed, due to the introduction of the new frames as described above.
1) Multiple APs in an extended service set (ESS may have to coordinate responses).
2) Dialog token in a GAS Initial Response has to be dealt with (there is no specification of its use in IEEE 802.11-2012).
3) The text in IEEE 802.11-2012 clause 8.5.8.12/8.5.8.13, which states GAS Initial/Comeback Response is only transmitted to respond to GAS Initial/Comeback Query, may have to change.
4) IEEE 802.11-2012 clause 10.24.3 states "GAS messages shall be transmitted using individually addressed Public Action frames."

Reduced FILS Discovery Frame Transmission

In accordance with further implementations of the present disclosure, rather than send FILS Discovery frames on a continual periodic basis, an FILS-capable AP is configured to determine whether transmission of a FILS Discovery frame should be performed, based on at least one criterion, which can include the same criteria as listed above for the determination of whether to enter GA mode. Thus, the AP is able to determine whether or not to activate the transmission of FILS Discovery frames.

A FILS-capable wireless device can send a probe request to an AP that contains a FILS Capability field in an Extended Capabilities element. If the FILS Capability field is set to a specified value, such as "1", this informs the AP that the wireless device is FILS capable. More generally, a wireless device is able to send an indicator to an AP to indicate that the wireless device supports FILS operation.

Figure 5:
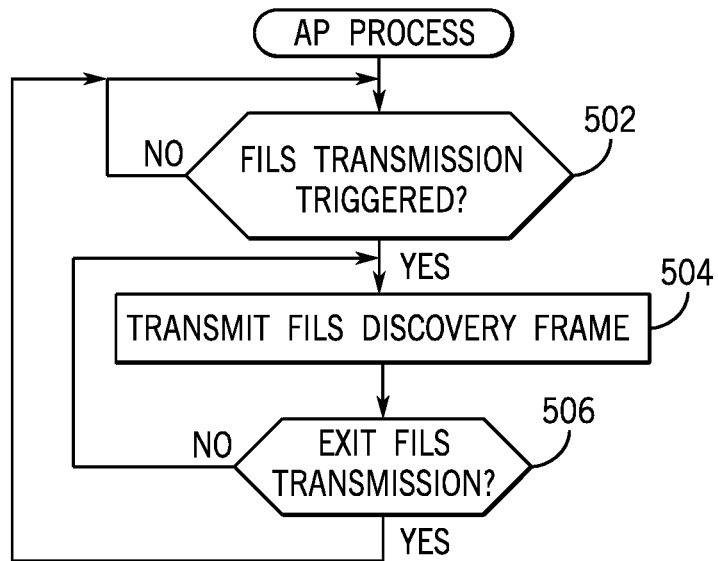
FIG. 5 is a flow diagram of a process of an AP according to alternative implementations.

FIG. 5 is a flow diagram of an example process performed by a FILS-capable AP according to some examples. The AP determines (at 502), based on at least one criterion, whether FILS Discovery transmission is triggered. Note that initially, the AP is set in a mode in which FILS Discovery transmission is not performed. In some examples, triggering of FILS transmission can be based on any or some combination of the criteria listed above for transitioning to the GA mode. Note that a single probe request can trigger the AP to perform FILS transmission in some examples.

In response to determining (at 502) that FILS transmission has been triggered, the AP transmits (at 504) a FILS Discovery frame. In some examples, the AP can transmit the FILS Discovery frame every X TUs for a specified time duration, e.g., Y TUs. A timer can be started at the AP to track the amount of elapsed time.

The AP next determines (at 506), based on at least one criterion, whether to exit FILS transmission. If not, the AP continues to transmit an FILS discovery frame (at 504). If so, the AP returns to determining whether an FILS transmission is to be triggered again (at 502).

System Architecture

Figure 6:
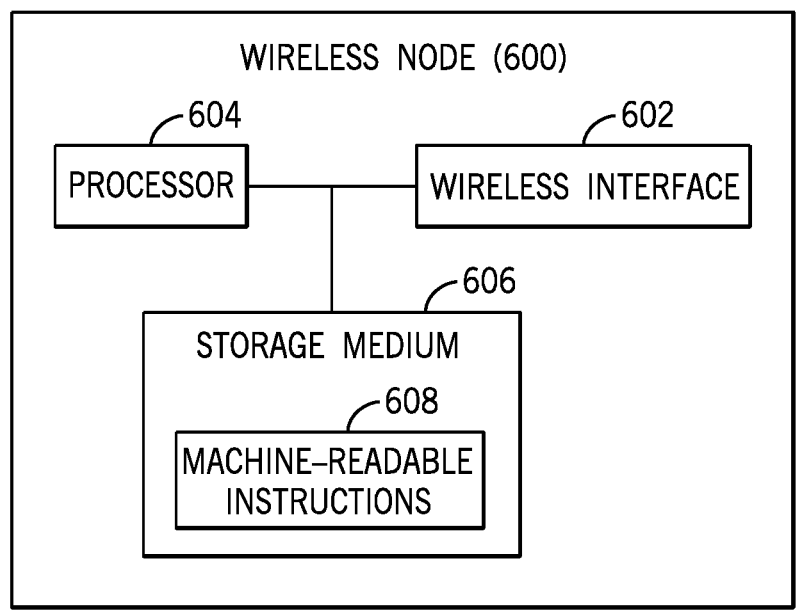
FIG. 6 is a block diagram of a wireless node incorporating some implementations of the present disclosure.

FIG. 6 is a block diagram of an example wireless node 600 according to implementations. The wireless node 600 can be a wireless device or an AP. The wireless node includes a wireless interface 602 to communicate wirelessly with another device. The wireless node 600 further includes a processor (or multiple processors) 604. A processor can include any or some combination of the following: a microprocessor, a core of a multi-core microprocessor, a microcontroller, a programmable integrated circuit, a programmable gate array, or any other hardware processing circuit.

The wireless node 600 further includes a non-transitory machine-readable or computer-readable storage medium 606 that stores machine-readable instructions 608 executable on the processor(s) 604 to perform respective tasks, such as any of those listed above. The storage medium 606 can any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A wireless device comprising:
    a wireless interface to communicate wirelessly with an access point; and
    at least one processor configured to:
        send, to the access point, a unicast query for first information relating to the access point; and
        receive, from the access point in response to the unicast query, a group-addressed mode indicator set to a first value to specify that the access point has activated a group-addressed transmission of information relating to the access point, and a message targeted to a group address, the message targeted to the group address comprising the first information relating to the access point sought by the unicast query.

2. The wireless device of claim 1, wherein the receiving of the group-addressed mode indicator occurs while the wireless device is in a pre-associated state with respect to the access point.

3. The wireless device of claim 1, wherein the at least one processor is configured to:
    determine whether the message targeted to the group address answers the unicast query of the wireless device; and
    in response to determining that the message targeted to the group address does not answer the unicast query of the wireless device, wait for an additional message from the access point.

4. The wireless device of claim 1, wherein the at least one processor is configured to:
    receive, from the access point, a message containing information about timing of transmissions of group-addressed messages including information relating to the access point; and
    based on the information about timing of transmissions of group-addressed messages including information relating to the access point, identify a next scheduled transmission of a group-addressed message including information relating to the access point.

5. The wireless device of claim 1, wherein the message targeted to the group address comprises a generic advertisement service (GAS) message targeted to the group address.

6. The wireless device of claim 1, wherein the message targeted to the group address comprises a fast initial link setup (FILS) discovery beacon frame.

7. The wireless device of claim 1, wherein the at least one processor is configured to:
    in response to receiving the group-addressed mode indicator set to a second value to specify that the access point has not activated the group-addressed transmission of information relating to the access point, receive an individually addressed message from the access point as a response to a unicast query of the wireless device.

8. The wireless device of claim 1, wherein the at least one processor is configured to:
    in response to receiving an indication from the access point that the access point has not activated group-addressed transmission of information relating to the access point, look for a unicast message from the access point as a response to a unicast query of the wireless device.

9. The wireless device of claim 1, wherein the group-addressed mode indicator is included in a beacon.

10. A method comprising:
    sending, by a wireless device to an access point, a unicast query for first information relating to the access point; and
    receiving, by the wireless device from the access point in response to the unicast query, a group-addressed mode indicator set to a first value to specify that the access point has activated a group-addressed transmission of information relating to the access point, and a message targeted to a group address, the message targeted to the group address comprising the first information relating to the access point sought by the unicast query.

11. The method of claim 10, wherein the receiving of the group-addressed mode indicator occurs while the wireless device is in a pre-associated state with respect to the access point.

12. The method of claim 10, further comprising:
determining, by the wireless device, whether the message targeted to the group address answers the unicast query of the wireless device, and
in response to determining that the message targeted to the group address does not answer the unicast query of the wireless device, waiting, by the wireless device, for an additional message from the access point.

13. The method of claim 10, further comprising:
receiving, by the wireless device from the access point, a message containing information about timing of transmissions of group-addressed messages including information relating to the access point; and
based on the information about timing of transmissions of group-addressed messages including information relating to the access point, identifying, by the wireless device, a next scheduled transmission of a group-addressed message including information relating to the access point.

14. The method of claim 10, wherein the message targeted to the group address comprises a generic advertisement service (GAS) message targeted to the group address or a fast initial link setup (FILS) discovery beacon frame.

15. The method of claim 10, further comprising:
in response to receiving the group-addressed mode indicator set to a second value to specify that the access point has not activated the group-addressed transmission of information relating to the access point, receiving, by the wireless device, an individually addressed message from the access point as a response to a unicast query of the wireless device.

16. The method of claim 10, further comprising:
in response to receiving an indication from the access point that the access point has not activated group-addressed transmission of information relating to the access point, looking for a unicast message from the access point as a response to a unicast query of the wireless device.

17. A non-transitory machine-readable storage medium comprising instructions that upon execution cause a wireless device to:
send, to an access point, a unicast query for first information relating to the access point; and
receive, from the access point in response to the unicast query, a group-addressed mode indicator set to a first value to specify that the access point has activated a group-addressed transmission of information relating to the access point, and a message targeted to a group address, the message targeted to the group address comprising the first information relating to the access point sought by the unicast query.

18. The non-transitory machine-readable storage medium of claim 17, wherein the instructions that upon execution cause the wireless device to:
receive, from the access point, a message containing information about timing of transmissions of group-addressed messages including information relating to the access point; and
based on the information about timing of transmissions of group-addressed messages including information relating to the access point, identify a next scheduled transmission of a group-addressed message including information relating to the access point.

* * * * *